(12) United States Patent
Janardhanan (10) Patent No.: US 9,590,893 B2
(45) Date of Patent: *Mar. 7, 2017

(54) SYSTEM AND METHOD FOR MANAGEMENT OF NETWORK LINKS BY TRAFFIC TYPE

(71) Applicant: DELL PRODUCTS L.P., Round Rock, TX (US)

(72) Inventor: Pathangi Narasimhan Janardhanan, Chennai (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,009

(22) Filed: Jun. 22, 2016

(65) Prior Publication Data

US 2016/0301600 A1    Oct. 13, 2016

Related U.S. Application Data

(63) Continuation of application No. 14/137,637, filed on Dec. 20, 2013, now Pat. No. 9,398,487.

(51) Int. Cl.
| | |
|---|---|
| *H04L 12/709* | (2013.01) |
| *H04W 28/02* | (2009.01) |
| *H04L 12/26* | (2006.01) |
| *H04L 12/931* | (2013.01) |
| *H04W 88/14* | (2009.01) |

(52) U.S. Cl.
CPC ........ *H04L 45/245* (2013.01); *H04L 43/0811* (2013.01); *H04L 43/0817* (2013.01); *H04L 49/20* (2013.01); *H04W 28/0231* (2013.01); *H04W 88/14* (2013.01)

(58) Field of Classification Search
CPC ... H04L 45/245; H04L 43/0811; H04L 49/20; H04L 43/0817; H04W 28/0231; H04W 88/14
See application file for complete search history.

(56) References Cited

U.S. PATENT DOCUMENTS

| | | | |
|---|---|---|---|
| 2005/0281283 A1* | 12/2005 | Beecher ............... | H04L 5/1423 370/449 |
| 2008/0037477 A1* | 2/2008 | Axelsson ............... | H04L 45/02 370/338 |
| 2010/0077067 A1* | 3/2010 | Strole ............... | G06F 15/17393 709/223 |

(Continued)

*Primary Examiner* — Christopher Grey
(74) *Attorney, Agent, or Firm* — Haynes & Boone, LLP.

(57) ABSTRACT

A system and method for management of a network link includes a switching device that includes a control unit and a port coupled to the control unit. The port couples the switching device to a partner switching device using a network link. The control unit is configured to receive a first packet over the network link from the partner switching device and determine whether the first packet includes a first traffic type state separation (TTSS) field. When the first packet includes the first TTSS field, the control unit is configured to determine a first network link state for the network link for a first traffic type and a second network link state for the network link for a second traffic type. Otherwise, the control unit is configured to determine a combined network link state for the network link that applies to both the first and the second traffic types.

20 Claims, 4 Drawing Sheets

(56) References Cited

U.S. PATENT DOCUMENTS

| | | | |
|---|---|---|---|
| 2010/0103833 A1* | 4/2010 | Englund | H04L 1/0026 370/252 |
| 2013/0301407 A1* | 11/2013 | Zhou | H04L 45/245 370/230 |
| 2014/0314095 A1 | 10/2014 | Saltsidis et al. | 370/394 |
| 2015/0236949 A1* | 8/2015 | Mahadevan | H04L 45/22 709/202 |

* cited by examiner

SYSTEM AND METHOD FOR MANAGEMENT OF NETWORK LINKS BY TRAFFIC TYPE

CROSS-REFERENCED APPLICATIONS

The present application is a continuation of U.S. patent application Ser. No. 14/137,637 filed on Dec. 20, 2013, which is incorporated by reference in its entirety.

BACKGROUND

The present disclosure relates generally to information handling systems, and more particularly to management of network links by traffic type.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling many types of communication and information. Making this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric. This can be further complicated through other networking trends such as parallelization.

Many networks utilize parallelization and other techniques to improve the forwarding function between two network nodes. By employing parallelization, redundancy is built into a network so that it is possible that more than one path exists between any two nodes. This provides suitably aware network switching products with the ability to select between the redundant paths to avoid network congestion, balance network loads, or to avoid failures in the network. Parallelization also provides the ability to handle more network traffic between two nodes than is possible when parallelization is not utilized. When two network switching products are coupled together using multiple network links either of the network switching products may generally select from any of the network links when forwarding network traffic to the other network switching product. In some implementations this parallelization in network is treated in a more formalized fashion in the form of a link aggregation group (LAG). In some implementations, two or more network switching products may be bundled into a peer group to provide redundancy and failover support when one of the network switching products is unable to forward network traffic. To take advantage of the peer group other network switching products may be coupled to more than one of the network switching products in the peer groups using network links. In this configuration, the network links are often bundled into a LAG that is sometimes referred to as a virtual link trunk (VLT).

In order to support the flexible management of the network links in LAGs and VLTs, protocols such as the Link Aggregation Control Protocol (LACP) are used to manage the status or state of each of the network links. The network switching products at each end of a network link exchange LACP messages to negotiate when the network link may be used to forward network traffic between the network switching products, whether the network link is part of LAG or VLT, and/or the like. Unfortunately, the mechanisms of LACP generally assume that network traffic using a network link should be treated the same, and this isn't always the case. It may not always be advisable or even possible for network links or the network switching products coupled by the link to handle different types of network traffic.

Accordingly, it would be desirable to provide improved network switching products that can separately manage different kinds of network traffic on a network link.

SUMMARY

According to one embodiment, a network switching device includes a control unit and a port coupled to the control unit and configured to couple the network switching device to a partner network switching device using a network link. The control unit is configured to receive a first management packet over the network link from the partner network switching device and determine whether the first management packet includes a first traffic type state separation (TTSS) field. When the first management packet includes the first TTSS field, the control unit is further configured to determine a first network link state for the network link for a first traffic type and determine a second network link state for the network link for a second traffic type different from the first traffic type. When the first management packet does not include the first TTSS field, the control unit is further configured to determine a combined network link state for the network link that applies to both the first and the second traffic types.

According to another embodiment, a method of managing a network link includes receiving a first message over the network link from a partner device. The first message is received on a port of an actor device. The network link is coupled to the port. The method further includes determining whether the first message includes a first traffic type state separation (TTSS) field. When the first message includes the first TTSS field, the method further includes determining a first link status for the network link for a first type of network traffic and determining a second link status for the network link for a second type of network traffic different from the first type of network traffic. When the first message does not include the first TTSS field, the method further includes determining a combined link status for the network link that applies to both the first and the second types of network traffic.

According to yet another embodiment, an information handling system includes a first switch. The first switch includes a control unit comprising one or more processors, a memory coupled to the control unit, and a port coupled to the control unit and configured to couple the first switch to a second switch using a network link. The memory includes a plurality of machine-readable instructions which when executed by the one or more processors are adapted to cause the one or more processors to receive a first management message over the network link from the second switch and determine whether the first management message includes a first traffic type state separation (TTSS) field. When the first management message includes the first TTSS field, the one or more processors are, the plurality of machine-readable instructions which when executed by the one or more processors are further adapted to cause the one or more processors to determine a first status for the network link for a first network traffic type and determine a second status for the network link for a second network traffic type different from the first network traffic type. When the first management message does not include the first TTSS field, the plurality of machine-readable instructions which when executed by the one or more processors are further adapted to cause the one or more processors to determine a combined status for the network link that applies to both the first and the second network traffic types.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
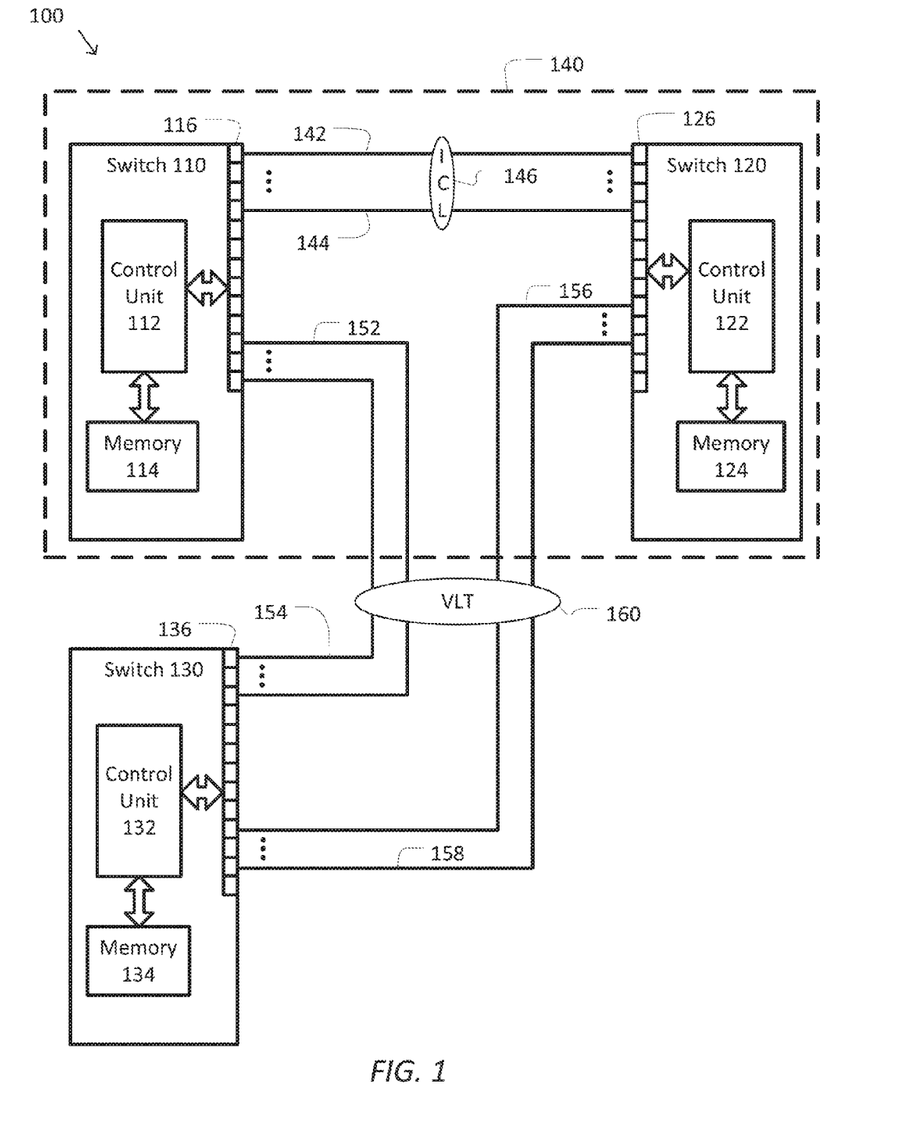
FIG. 1 shows a simplified diagram of a network according to some embodiments.

FIG. 1 shows a simplified diagram of a network 100 according to some embodiments. As shown in FIG. 1, network 100 may include network switching devices or switches 110, 120, and 130. And although only three switches are shown in network 100, it would be understood that network 100 may include any number of switches. As shown, switch 100 includes a control unit 112 and a memory 114. Control unit 112 is coupled to memory 114 and may control the operation of switch 110. In some examples, control unit 112 may be used to make forwarding decisions for network traffic being handled by switch 110. In some examples, control unit 112 may include one or more processors, central processing units, microprocessors, microcontrollers, multi-core processors, field programmable gate arrays (FPGAs), application specific integrated circuits (ASICs), and/or the like. Switch 110 further includes one or more ports 116 for coupling switch 110 to other switches and/or network devices using network links. In some examples, control unit 112 may use one or more protocols to communicate with the other switches and network devices using the one or more ports 116 and network links. Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Similarly, switch 120 includes a control unit 122 and memory 124. Control unit 122 is coupled to memory 124 and may control the operation of switch 120. In some examples, control unit 122 may be used to make forwarding decisions for network traffic being handled by switch 120. In some examples, control unit 122 may include one or more processors, central processing units, microprocessors, microcontrollers, multi-core processors, FPGAs, ASICs, and/or the like. Switch 120 further includes one or more ports 126 for coupling switch 120 to other switches and/or network devices using network links. In some examples, control unit 122 may use one or more protocols to communicate with the other switches and network devices using the one or more ports 126 and network links. Memory 124 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Similarly, switch 130 includes a control unit 132 and memory 134. Control unit 132 is coupled to memory 134 and may control the operation of switch 130. In some examples, control unit 132 may be used to make forwarding decisions for network traffic being handled by switch 130. In some examples, control unit 132 may include one or more processors, central processing units, microprocessors, microcontrollers, multi-core processors, field programmable gate arrays FPGAs, ASICs, and/or the like. Switch 130 further includes one or more ports 136 for coupling switch 130 to other switches and/or network devices using network links. In some examples, control unit 132 may use one or more protocols to communicate with the other switches and network devices using the one or more ports 136 and network links. Memory 134 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As further shown, switches 110 and 120 are bundled together to form a peer group 140. This means that switches 110 and 120 are cooperating to provide redundancy in the networking function they provide. In some instances, this may mean that both switch 110 and switch 120 may share a same network address. They may further share network information so that as one of the switches 110 or 120 learns forwarding information about the rest of network 100 it may share the forwarding information with the other switch 120 or 110 in peer group 140. By sharing this forwarding information, switches 110 and 120 are able to appear as a single virtual switch to the rest of network 100 so that other switches coupled to switches 110 and 120 are able to forward network traffic to either switch 110 or 120 as if they are the same switch.

To help peer group 130 function as if it is one switch, switches 110 and 120 are coupled together using at least one network link. As shown in FIG. 1, switches 110 and 120 are coupled together using network links 142 and 144. Network links 142 and 144 each couple together a respective port 116 on switch 110 with a respective port 126 on switch 120. To support flexible forwarding of network traffic between switches 110 and 120, network links 142 and 144 are grouped together to form a special LAG sometimes called an inter-chassis link (ICL) 146. Switches 110 and/or 120 may use any of the network links in ICL 146 to exchange network traffic, including the forwarding and/or network information they share between themselves. And although only two network links 142 and 144 are shown in ICL 146, it is assumed that ICL 146 may include any number of network links.

Switch 130 is also coupled to switches 110 and 120. Network links 152 and 154 each couple a respective port 136 on switch 130 with a respective port 116 on switch 110. Similarly, network links 156 and 158 each couple a respective port 136 on switch 130 with a respective port 126 on switch 120. However, because switches 110 and 120 are organized as peer group 140, the network links 152, 154, 156, and 158 may be grouped into a VLT 160. The existence of VLT 160 allows switch 130 to treat switches 110 and 120 as a single virtual switch in the form of peer group 140. This generally means that switch 130 may forward network traffic for destinations beyond peer group 140 using any of the network links 152, 154, 156, and/or 158 in VLT 160, irrespective of which of switches 110 or 120 the network traffic goes to, because both switches 110 and 120 are able to properly forward the network traffic on to its ultimate destination.

Figure 2:
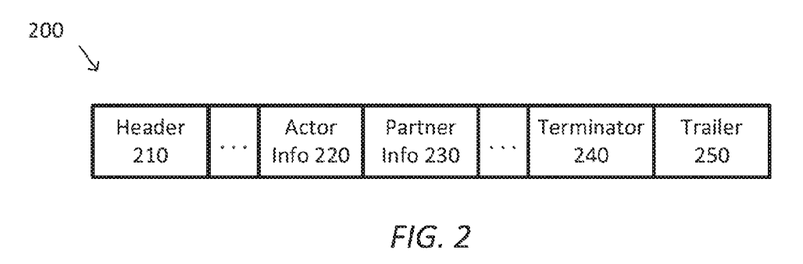
FIG. 2 is a simplified diagram of a management packet for a network link according to some embodiments.

FIG. 2 is a simplified diagram of a management packet 200 for a network link according to some embodiments. As shown in FIG. 2, management packet 200 includes a sequence of fields used by an actor switch to exchange management and/or status information with a partner switch at the other end of a network link. For example, any of switches 110, 120, and/or 130 may use management packet 200 to determine whether a network link, such as any of network links 142, 144, 152, 154, 156, and/or 158, may be used to exchange network traffic. As shown management packet 200 includes a header 210, an actor information field 220, a partner information field 230, a terminator field 240, and a trailer 250.

Management packet 200 is framed by header 210 and trailer 250. Header 210 may include one or more sub-fields or values including an identifier that identifies management packet 200 as a management packet. Trailer 250 indicates the end of the framed management packet 200 and may include error correction or detection fields such as a check sum or CRC code. The payload or body of management packet 200 may be designed to handle a flexible number of payload fields, such as the actor information field 220 and the partner information field 230. To account for the variable number of payload fields, the terminator field 240 may indicate the end of the payload fields.

In some embodiments, management packet 200 may represent a complete message or may be part of a message being transmitted on a network link. For example, management packet 200 may piggy pack on another message being transmitted on the network link. In some embodiments, management packet may be a LACP protocol data unit (PDU).

Figure 3:
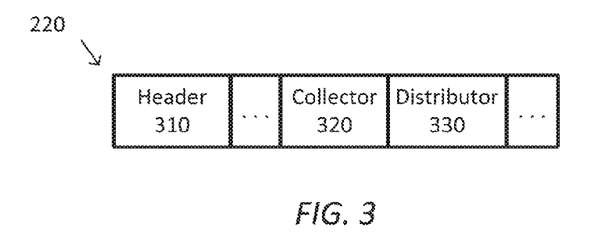
FIG. 3 is a simplified diagram of an actor information field of the management packet of FIG. 2 according to some embodiments.

FIG. 3 is a simplified diagram of the actor information field 220 of management packet 200 of FIG. 2 according to some embodiments. As shown in FIG. 3, actor information field 220 includes a sequence of sub-fields including a header 310, an actor collector (AC) sub-field or status value 320, and an actor distributor (AD) sub-field or status value 330. Header 310 includes a code to distinguish actor information field 220 from other payload fields. The actor information field 220 indicates the present capability for the actor switch forming and sending management packet 200. The AC status value 320 indicates whether the actor switch is prepared to receive or collect network traffic on the network link. The AD status value 330 indicates whether the actor switch is prepared to send or distribute network traffic on the network link. In some embodiments, the AC status value 320 and/or AD status value 330 may be assigned a value of Up when the corresponding capability is ready in the actor switch and a value of Dn (i.e., down) when the corresponding capability is not ready in the actor switch. In some examples, each of the AC status value 320 and/or the AD status value 330 may be encoded using a bit. In some examples, a logic 1 may indicate Up and a logic 0 may indicate Dn. In some examples, a logic 0 may indicate Up and a logic 1 may indicate Dn.

The actor switch uses actor information field 220 to notify the partner switch at the other end of the network link whether it is prepared to receive and/or send network traffic using the network link. In some embodiments, actor information field 220 may be implemented using a type-length-value (TLV) field. For example, actor information field 220 may be an Actor Information TLV of LACP.

Figure 4:
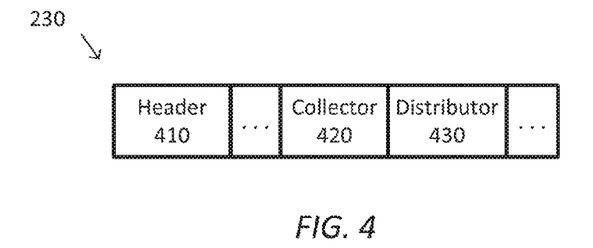
FIG. 4 is a simplified diagram of a partner information field of the management packet of FIG. 2 according to some embodiments.

FIG. 4 is a simplified diagram of the partner information field 230 of management packet 200 of FIG. 2 according to some embodiments. As shown in FIG. 4, partner information field 230 includes a sequence of sub-fields including a header 410, a partner collector (PC) sub-field or status value 420, and a partner distributor (PD) sub-field status value 430. Header 410 includes a code to distinguish partner information field 230 from other payload fields. The partner information field 230 indicates what the actor switch forming and sending management packet 200 believes to be the current capabilities of the partner switch at the other end of the network link. The PC status value 420 indicates whether the actor switch believes the partner switch is prepared to receive or collect network traffic on the network link. The partner distributor status value 430 indicates whether the actor switch believes the partner switch is prepared to send or distribute network traffic on the network link. In some embodiments, the PC status value 420 and/or PD status value 430 may be assigned a value of Up when the corresponding capability is believed to be ready in the partner switch and a value of Dn (i.e., down) when the corresponding capability is believed to be not ready in the partner switch. In some examples, each of the PC status value 420 and/or the PD status value 430 may be encoded using a bit. In some examples, a logic 1 may indicate Up and a logic 0 may indicate Dn. In some examples, a logic 0 may indicate Up and a logic 1 may indicate Dn.

In some embodiments, the partner information field 230 may be used to acknowledge the capability information received in the actor information field 220 of a management packet 200 received from the partner switch. In some embodiments, partner information field 230 may be implemented using a TLV field. For example, partner information field 230 may be a Partner Information TLV of LACP.

In combination, the status values in the actor information field 220 and the partner information field 230 may be used to determine the state of the network link on which management packet 200 is transmitted. When the AD status value 330 and the PC status value 420 are both Up, this means that the network link may be used to transmit network traffic from the actor switch to the partner switch. When the AC status value 320 and the PD status value 430 are both Up, this means that the network link may be used to transmit network traffic from the partner switch to the actor switch.

Figure 5:
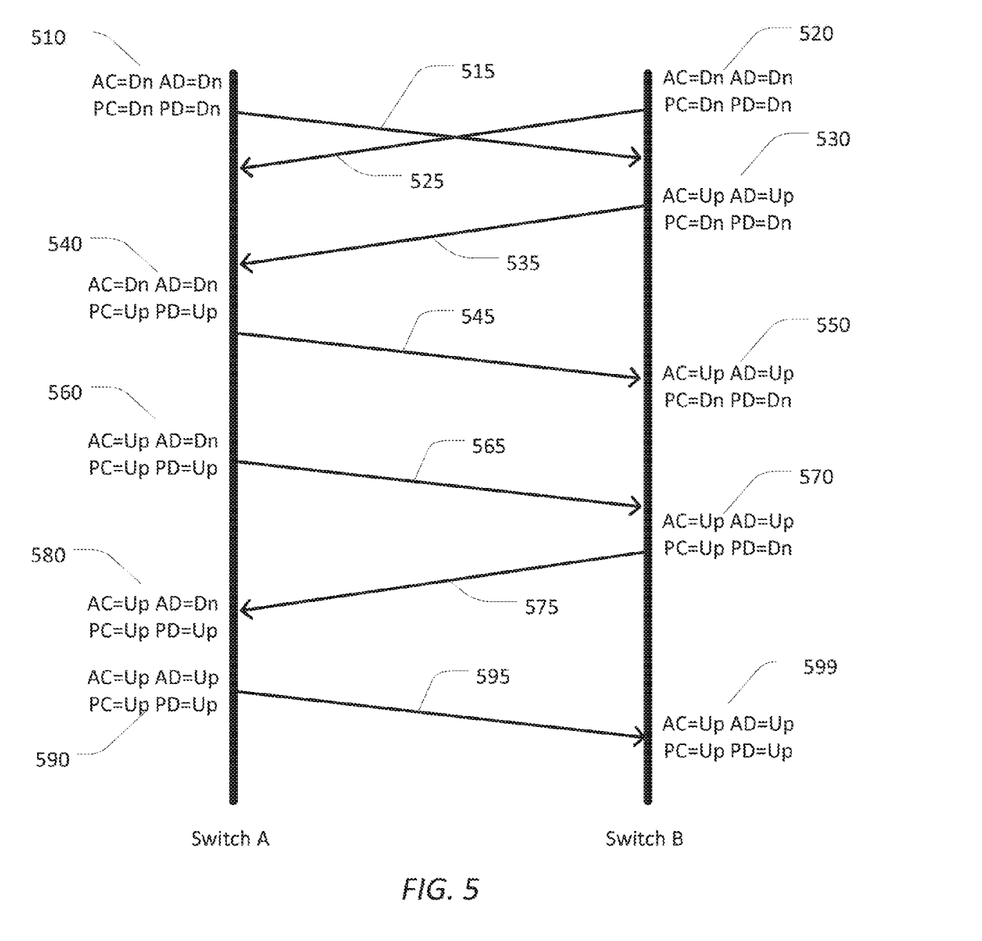
FIG. 5 is a simplified diagram of message passing to manage a network link according to some embodiments.

FIG. 5 is a simplified diagram of message passing to manage a network link according to some embodiments. As shown in FIG. 5, two switches, switch A and switch B, at the two ends of a network link, are shown demonstrating the exchange of actor and partner status values to manage the state of a network link. In some examples, switch A and switch B may each be any of switches 110, 120, and/or 130. To manage the state of the network link, both switch A and switch B each manage four status values associated with the state of the network link. The four status values include an actor collector (AC) status value, an actor distributor (AD) status value, a partner collector (PC) status value, and a partner distributor (PD) status value. In general, each of these four status values represents elements of the state of the network link from the perspective of the respective switch. In some examples, the partner status values correspond to the corresponding actor status values last received from the switch at the remote end of the network link and the actor status values correspond to those status values as known by the switch for its end of the network link and which are typically based on ability of the switch to either transmit or receive network traffic on the network link. Thus, the partner status values at switch A correspond to the actor status values transmitted by switch B and the partner values at switch B correspond to the actor status values transmitted by switch A. As shown in FIG. 5, time is generally depicted as flowing from older moments in time at the top of the figure to newer moments in time at the bottom of the figure. The directed arrows represent an exchange of information via transmission and reception as shown by the direction of the arrow. In some examples, each of the arrows may represent the transmission of a management packet similar to management packet 200 that includes both the actor information field 220 and the partner information field 230.

At time 510, switch A has recorded that each of the four status values are Dn. From the perspective of switch A this means that its AC and AD status values are down so that switch A is not prepared to receive or transmit other network traffic on the network link. Additionally, its PC and PD status values are down indicating that switch A does not believe that switch B is not prepared to receive or transmit other network traffic on the network link. In some examples, setting each of the four of the status values to Dn may represent default status values for the network link before any status values are exchanged. Switch A may periodically transmit its actor and partner status values to switch B. This is shown by the arrow from switch A to switch B indicating transmission of a management packet in a status update 515.

At time 520, switch B similarly has recorded that each of the four status values are Dn. Switch B may periodically transmit its AC, AD, PC, and PD to switch A, using a management packet, as shown in a status update 525. When switch B receives status update 515 from switch A, switch B interprets the AC and AD status values transmitted by switch A as the corresponding remote collector and distributor status values and uses them to update the PC and PD status values, respectively, in switch B.

At time 530, switch B determines that it is able to both receive and send network traffic on the network link and changes its AC and AD status values, respectively, to Up. As a result of this change in status values, switch B forms and transmits a status update 535 to switch A that includes the new AC and AD status values as well as the PC and PD status values as a confirmation of the AC and AD status values received from switch A as part of status update 515. In some examples, status update 535 may be sent more than once, such as during each periodic status update exchange with switch A.

At time 540, switch A receives status update 535 from switch B and records the AC and AD status values included therein as the PC and PD status values, respectively of switch A. In some examples, switch A may respond to status update 535 by transmitting a status update 545 indicating the four status values of switch A. In addition, the PC and PD status values of status update 545 may act as an acknowledgement of the changes in AC and AD, respectively, of switch B that were received as part of status update 535. In some examples, status update 545 may be sent more than once, such as during each periodic status update exchange with switch B.

At time 550, switch B receives status update 545 from switch A and records the AC and AD status values included therein as the PC and PD status values, respectively, of switch B. More specifically, the PC and PD values of switch B remain Dn. Although not shown, switch B may report its four status values in one or more status updates sent back to switch A.

At time 560, switch A determines that it is able to receive network traffic on the network link and changes its AC status value to Up, but keeps the AD status value to Dn. As a result of this change in AC, switch A forms and transmits a status update 565 to switch B that includes the new AC status value as well as the PC and PD status values as a continuing confirmation of the AC and AD status values received from switch B as part of status update 535. In some examples, status update 565 may be sent more than once, such as during each periodic status update exchange with switch B.

At time 570, switch B receives status update 565 and notes that the AC status value included therein is Up indicating that switch A is ready to receive network traffic on the network link. Because switch B is ready to sending network traffic on the network link (i.e., AD of switch B is Up), switch B may begin send network traffic to switch A using the network link. Switch B may further acknowledge the change in the AC status value of switch A (the PC status value of switch B) by forming and sending one or more times a status update 575 with the four status values of switch B.

At time 580, switch A may receive status update 575 and which acts as a confirmation that switch B knows that switch A can receive network traffic on the network link. Although not shown, switch A may report its four status values in one or more status updates sent back to switch B.

At time 590, switch A determines that it is able to send network traffic on the network link and changes its AD status value to Up. As a result of this change in AD, switch A forms and transmits a status update 595 to switch B that includes the new AD status value as well as the PC and PD status values as a continuing confirmation of the AC and AD status values received from switch B as part of status update 575. In some examples, status update 595 may be sent more than once, such as during each periodic status update exchange with switch B.

At time 599, switch B receives status update 595 and notes that the AD status value included therein is Up indicating that switch A is ready to send network traffic on the network link. Because switch B is ready to receive network traffic on the network link (i.e., AC of switch B is Up), switch B may begin receiving network traffic from switch A using the network link. Switch B may further acknowledge the change in the AD status value of switch A (the PD status value of switch B) by forming and sending one or more times a status update (not shown) with the four status values of switch B.

At this point the network link is fully up and may be used to send network traffic in both directions between switches A and B.

As discussed above and further emphasized here, FIG. 5 is merely an example which should not unduly limit the scope of the claims. One of ordinary skill in the art would recognize many variations, alternatives, and modifications. In some embodiments, switches A and/or B may periodically exchange additional status updates between any of the times depicted in FIG. 5. In some embodiments, the status update exchange may be used to change the state of the network link to down in either or both directions. In some embodiments, changes may be made to the partner status values based on timers. In some examples, switches A and/or B may start and/or restart timers whenever they transmit and/or receive a status update. In some examples, when a respective timer times out before a subsequent status update is received, the corresponding switch may revert its PC and PD values to Dn indicating that the network link is not to be used for network traffic.

The message passing of FIG. 5 and the management packet 200 assume a somewhat simplistic model of the network traffic that may be exchanged on a network link. Other than making a distinction between the somewhat limited use of the network link to exchange management packets like management packet 200, the approach operates under the assumption that the rest of the network traffic on the network link is treated the same way. This is generally not true as network links are often called upon to carry many different kinds of network traffic for many different purposes. The network link is often used to exchange user data on the network link as well as to exchange control and/or management data for protocols other than LACP. The handling of control and/or management data by the switches coupled by the network links is often different than the handling of the data traffic. For example, the control and/or management data may be exchanged between the two switches coupled by the network link, whereas the data traffic may often get forwarded to destinations beyond the two switches. Thus, to be able to exchange control and/or management traffic, the two switches should have the appropriate control protocols for handling the control and/or management traffic up and running. In contrast, the two switches should have forwarding tables and the like in place before handling data traffic. In some embodiments, different types of data traffic may also involve different handling in the two switches. For example, multi-cast traffic may use different forwarding tables than uni-cast traffic. In some embodiments, the differences in the handling of network traffic may also be caused by the use of peer groups, such as peer group 140 of FIG. 1, because the network links in the same LAG or VLT may be coupling different pairs of physical switches, which may be in different states of readiness for different types of network traffic.

Referring back to the embodiments of FIG. 1, consider the case where switch 120 has recently been rebooted. While switch 120 was rebooting, the forwarding information recorded by switch 110 for peer group 140 may have changed. And so even though switch 120 may be prepared to handle control traffic from switch 130 over network links 156 and/or 158, switch 120 may not be ready to handle the forwarding of data traffic until switch 120 is able to synchronize its forwarding tables with switch 110 over ICL 146. During this synchronization period it would be helpful if switches 120 and 130 could exchange control traffic while still preventing the exchange of data traffic. This capability is not supported by the message passing of FIG. 5 using management packet 200.

Consider another case where the rebooting of switch 120 occurred as a result of an upgrade to switch 120. When part of that upgrade included an upgrade to one or more control protocols, it now may be desirable to limit the exchange of control traffic between switch 130 and peer group 140 to network links 156 and/or 158 between switches 120 and 130. In this case it would be helpful if the exchange of control data between switches 110 and 130 on network links 152 and 154 could be suspended without affecting the ability of network links 152 and 154 to be used to exchange data traffic. Again, this capability is not supported by the message passing of FIG. 5 using management packet 200.

Accordingly, it would be advantageous to allow the state of a network link to be managed differently for different types of network traffic. It would also be advantageous if this could be accomplished while still supporting legacy switches that manage network traffic on network links uniformly, irrespective of traffic type.

Figure 6:
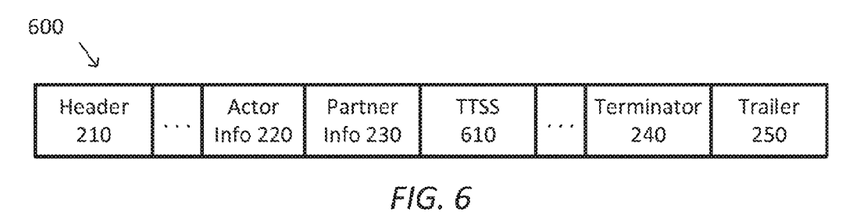
FIG. 6 is a simplified diagram of another management packet for a network link according to some embodiments.

FIG. 6 is a simplified diagram of another management packet 600 for a network link according to some embodiments. As shown in FIG. 6, management packet 600 includes a sequence of fields used by one switch to exchange management and/or status information with another switch. For example, any of switches 110, 120, and/or 130 may use management packet 600 to determine whether a network link, such as any of network links 142, 144, 152, 154, 156, and/or 158, may be used to exchange different types of network traffic. Like management packet 200 of FIG. 2, management packet 600 includes header 210, actor information field 220, partner information field 230, terminator field 240, and trailer 250. In contrast, however, management packet 600 additionally includes a traffic type status separator (TTSS) field 610.

In some embodiments, management packet 600 may represent a complete message or may be part of a message being transmitted on a network link. For example, management packet 600 may piggy pack on another message being transmitted on the network link. In some embodiments, management packet may be a LACP PDU.

Figure 7:
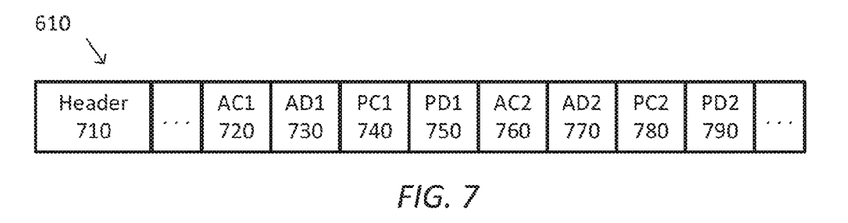
FIG. 7 is a simplified diagram of a traffic type status separator field of the management packet of FIG. 6 according to some embodiments.

FIG. 7 is a simplified diagram of the traffic type status separator field 610 of management packet 600 of FIG. 6 according to some embodiments. As shown in FIG. 7, TTSS field 610 includes a header 710 that includes a code to distinguish TTSS field 610 from other payload fields. TTSS field 610 further includes four sub-fields or status values for each type of network traffic being separately managed on a network link. These four status values include, for each traffic type, an actor collector (ACx) status value 720, 760, and an actor distributor (ADx) status value 730, 770, a partner collector (PCx) status value 740, 780, and a partner distributor (PDx) status value 750, 790, where x designates a particular traffic type. In some embodiments, the AC1 720, AD1 730, PC1 740, and PD1 750 status values may be used to manage the network link state for data traffic and the AC2 760, AD2 770, PC2 780, and PD2 790 status values may be used to manage the network link state for control traffic. In some embodiments, TTSS field 610 may be designed to include other than two sets of status values depending upon the number of different traffic types for which separate network link state is being managed. In some embodiments, TTSS field 610 may further include additional sub-fields and/or management packet 600 may further include additional fields or TLVs that may be used to associate each of the status value groups with different types of traffic using, for example, pre-assigned codes may be used to identify different types of network traffic. In some embodiments, management packet 600 may include multiple TTSS field 610, which each TTSS field 610 being used for each type of network traffic being managed.

The ACx, ADx, PCx, and PDx status values 720-790 may be used similarly to the actor and partner status values described in FIGS. 3-5. For example the ACx status value 720, 760 may be used to indicate whether the actor switch is prepared to receive or collect network traffic associated with type x on the network link, the ADx status value 730, 770 may be used to indicate whether the actor switch is prepared to send or distribute network traffic associated with type x on the network link, the PCx status value 740, 780 may be used to indicate whether the actor switch believes the partner switch is prepared to receive or collect network traffic on the network link, and the PDx status value 750, 790 may be used to indicate whether the actor switch believes the partner switch is prepared to send or distribute network traffic on the network link.

In some embodiments, each of the ACx, ADx, PCx, and PDx status values 720-790 may be assigned a value of Up when the corresponding capability is ready in the switch and a value of Dn when the corresponding capability is not ready in the switch. In some examples, each of the ACx, ADx, PCx, and PDx status values 720-790 may be encoded using a bit. In some examples, a logic 1 may indicate Up and a logic 0 may indicate Dn. In some examples, a logic 0 may indicate Up and a logic 1 may indicate Dn.

In some embodiments, the ACx, ADx, PCx, and PDx status values 720-790 may be used to share desired network link state for the actor switch and confirm and/or acknowledge perceived network link state for the partner switch separately for each type of network traffic being separately managed on the network link. In addition, message passing similar to the message passing described in FIG. 5 may be used to negotiate whether network traffic may be sent from the actor switch to the partner switch and/or from the partner switch to the actor switch for each of the network traffic types. For example, when an actor switch determines that the ADx and PCx status values are both Up for a network link then the network link may be used to send network traffic associated with type x on the network link from the actor switch to the partner switch. Similarly, when the actor switch determines that the ACx and PDx status values are both Up for a network link then the network link may be used to send network traffic associated with type x on the network link from the partner switch to the actor switch. This supports separate state management for each type of network traffic on the network link.

Referring back to FIG. 6 and management packet 600, to support backward compatibility with switches that are not able to manage network link state by traffic type, management packet 600 further includes actor information field 220 and partner information field 230. Because protocols like LACP are designed to support the use and inclusion of vendor-specific fields and TLVs, switches that do not recognize the TTSS field 610 will ignore TTSS field 610 and may continue to use actor information field 220 and partner information field 230 to manage network link state as described above with respect to FIGS. 2-5. Consequently, switches using TTSS field 610 may continue to form and include actor information field 220 and partner information field 230 when exchanging management packet 600 to provide legacy support. In some embodiments, the actor switch forming and sending management packet 600 may manage the AC status value 320 and the AD status value 330 in the actor information field 220 based on various combinations of the ACx and ADx status values of the TTSS field 610. In some examples, the AC status value 320 may be reported as Up when each of the ACx status values are Up and the AD status value 330 may be reported as Up when each of the ADx status values are Up. In some examples, other logical combinations or the ACx status values may be used to determine the AC status value 320 and other logical combinations of the ADx status values may be used to determine the AD status value 330. In some examples, the AD status value 330 may be reported as Up when any of the ADx status values are Up because the ability to send or distribute any type of network traffic is consistent with the ability to send or distribute network traffic. The PC status value 420 and the PD status value 430 of the partner information field 230 may be determined by the AC status value 320 and the AD status value 330, respectively, as reported in a management packet 200 received from the partner switch.

Figure 8:
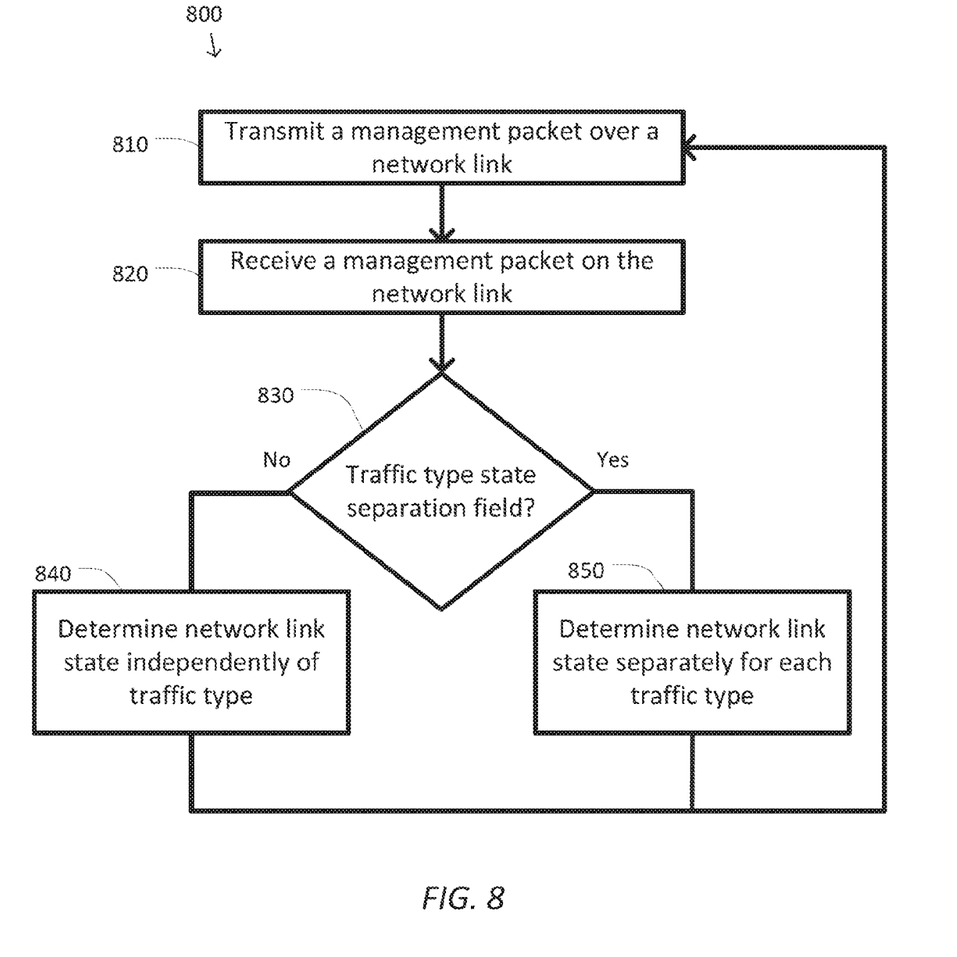
FIG. 8 is a simplified diagram of a method of network link management according to some embodiments.

FIG. 8 is a simplified diagram of a method 800 of network link management according to some embodiments. In some embodiments, one or more of the processes 810-850 of method 800 may be implemented, at least in part, in the form of executable code stored on non-transient, tangible, machine readable media that when run by one or more processors (e.g., the one or more processors of control units 112, 122, and/or 132) may cause the one or more processors to perform one or more of the processes 810-850. In some embodiments, method 800 may be performed in a switch, such as any of the switches 110, 120, and/or 130 for each of the network links coupled to one of the ports of the switch, such as any of the ports 116, 126, and/or 136. In some embodiments, method 800 may implement an extended version of the message passing of FIG. 5 that supports management of a network link independently of traffic type and/or separately by traffic type based on the capabilities of the switches coupled to each end of a network link. In some embodiments, process 800 may support network link management between switches that may or may not support network link management by traffic type.

At a process 810, a management packet is transmitted over a network link. An actor switch forms and transmits an extended management packet, such as management packet 600, on the network link to a partner switch. In some examples, the actor switch and the partner switch may each be any of the switches 110, 120, and/or 130. In some examples, the extended management packet may be transmitted in response to a received management packet or as part of a periodic exchange of management packets with the partner switch. In some examples, the extended management packet may be transmitted as a stand-alone message or in piggy-back fashion as part of another message transmitted over the network link.

The extended management packet may include an actor information field 220 and a partner information field 230 to support legacy partner switches and a TTSS field 610 to support network link management by traffic type. The AC status value 320 in the actor information field 220 may be set to Up when the actor switch is prepared to receive or collect each type of network traffic on the network link. The AD status value 330 in the actor information field 220 may be set to Up when the actor switch is prepared to send or distribute any type of network traffic on the network link. Each of the ACx status values 720, 760 in the TTSS field 610 may be set to Up based on whether the actor switch is able to receive or collect network traffic of the corresponding type on the network link. Each of the ADx status values 730, 770 in the TTSS field 610 may be set to Up based on whether the actor switch is able to transmit or distribute network traffic of the corresponding type on the network link. The PC status value 420 and the PD status value 430 in the partner information field 230 may be set according to respective AC 320 and AD 330 status values received from the partner switch in a previous actor information field 220. When no previous actor information field 220 is received, the PC status value 420 and the PD status value 430 may default to Dn. Similarly, the PCx 740, 780 and the PDx 750, 790 status values may be set according to corresponding ACx 720, 760 and ADx 730, 770 status values received in a previous TTSS field 610 received from the partner switch. When no previous TTSS field 610 is received, the PCx 740, 780 and the PDx 750, 790 status values may default to Dn.

At a process 820, a management packet is received on the network link. In response to the management packet transmitted during process 810 or as a result of the periodic exchange of management packets, the partner switch may transmit a management packet on the network link that is received by the actor switch. In some examples, the received management packet may be received as a stand-alone message or in piggy-back fashion as part of another message received over the network link. Depending on whether the partner switch supports management of the network link based on traffic type, the received management packet may or may not include a TTSS field, such as TTSS field 610. In some examples, when the partner switch is a legacy switch that is not able to manage the network link by traffic type, the received management packet may be the management packet 200. In some examples, when the partner switch is able to manage the network link by traffic type, the received management packet may be the management packet 600.

At a process 830, it is determined whether the received management packet includes a TTSS field. The management packet received during process 820 is examined to determine whether the partner switch supports network link management by traffic type. This may be done by examining the received management packet to determine whether one of the fields is a TTSS field, such as TTSS field 610. In some embodiments, the TTSS field 610 may be detected by examining the received management packet to determine whether it contains a field and/or a TLV with a header 710 that includes the code used to distinguish the TTSS field 610 from other payload fields in the received management packet. When the received management packet includes the TTSS field, the state of the network link is determined based on traffic type using a process 850. When the received management packet does not include the TTSS field, the state of the network link is determined independently of traffic type using a process 840.

At the process 840, the state of the network link is determined independently of traffic type. When the partner switch is a legacy switch that does not support management of the network link state by traffic type, the partner switch may transmit management packets that do not include a corresponding TTSS field. However, the received management packet may contain an actor information field and a partner information field. The status values in the actor information field and the partner information field may be used to determine whether the network link may be used to send network traffic from the actor switch to the partner switch and/or from the partner switch to the actor switch (i.e., the state of the network link) independently of network traffic type. In some examples, when the actor information field is actor information field 220 and the partner information field is partner information field 230, the AC 320, AD 330, PC 420, and PD 430 status values may be used to determine the state of the network link. When the AD status value 330 and the PC status value 420 are both Up, this means that the network link may be used to transmit network traffic from the actor switch to the partner switch. When the AC status value 320 and the PD status value 430 are both Up, this means that the network link may be used to transmit network traffic from the partner switch to the actor switch.

The determined network link state is then applied to each type of network traffic on the network link. After determining the combined network link state, additional management packets may be exchanged using processes 810 and/or 820.

At the process 850, the state of the network link is determined separately for each traffic type. When the partner switch supports management of the network link state by traffic type, the partner switch may transmit management packets that include a corresponding TTSS field. The status values in the TTSS field may be used to determine whether the network link may be used to send network traffic from the actor switch to the partner switch and/or from the partner switch to the actor switch (i.e., the state of the network link) separately for each type of network traffic. For example, when the switch determines that the ADx and PCx status values are both Up for a network link then the network link may be used to send network traffic associated with type x on the network link from the actor switch to the partner switch. Similarly, when the switch determines that the ACx and PDx status values are both Up for a network link then the network link may be used to send network traffic associated with type x on the network link from the partner switch to the actor switch. Using each set of four ACx, ADx, PCx, and PDx status values, the separate network link state for each type of network traffic may be determined. After determining the separate network link states, additional management packets may be exchanged using processes 810 and/or 820.

Some embodiments of the switches 110, 120, and/or 130 may include non-transient, tangible, machine readable media that include executable code that when run by one or more processors may cause the one or more processors (e.g., the one or more processors of the control units 112, 122, and/or 132) to perform the processes of method 800 as described above. Some common forms of machine readable media that may include the processes of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A first switch comprising:
a control unit; and
a port coupled to the control unit and configured to couple the first switch to a second switch using a link;
wherein the control unit is configured to:
receive a first traffic type state separation (TTSS) field in a first management packet;
determine a first link state for the link for a first traffic type based on the first TTSS field and whether the first switch is ready to transmit network traffic of the first traffic type and receive network traffic of the first traffic type;
determine a second link state for the link for a second traffic type different from the first traffic type;
transmit a second TTSS field including:
a first actor collector status value indicating whether the first switch is ready to receive network traffic of the first traffic type;
a first actor distributor status value indicating whether the first switch is ready to transmit network traffic of the first traffic type;
a partner collector status value indicating an acknowledgement of a second actor collector status value received in the first TTSS field; and
a partner distributor status value indicating an acknowledgement of a second actor distributor status value received in the first TTSS field; and
exchange network traffic of the first traffic type with the second switch based on the first link state.

2. The first switch of claim 1, wherein:
the second actor collector status value indicates whether the second switch is ready to receive network traffic of the first traffic type on the link; and
the second actor distributor status value indicates whether the second switch is ready to transmit network traffic of the first traffic type on the link.

3. The first switch of claim 1, wherein the second TTSS field is transmitted in a second management packet to the second switch over the link, the second management packet including the second TTSS field, an actor information field, and a partner information field.

4. The first switch of claim 3, wherein the control unit is further configured to periodically exchange additional first and second management packets with the second switch.

5. The first switch of claim 1, wherein the first management packet is a link aggregation control protocol (LACP) data unit.

6. The first switch of claim 5, wherein the first TTSS field is a TTSS type-length-value (TLV) field compatible with the LACP.

7. The first switch of claim 1, wherein:
the first traffic type is data traffic; and
the second traffic type is control traffic.

8. A method comprising:
receiving, by a first switch on a port configured to couple the first switch to a second switch using a link, a first traffic type state separation (TTSS) field in a first management packet;
determining, by a control unit of the first switch, a first link state for the link for a first traffic type based on the first TTSS field and whether the first switch is ready to transmit network traffic of the first traffic type and receive network traffic of the first traffic type;
determining a second link state for the link for a second traffic type different from the first traffic type;
transmitting a second TTSS field including:
a first actor collector status value indicating whether the first switch is ready to receive network traffic of the first traffic type;
a first actor distributor status value indicating whether the first switch is ready to transmit network traffic of the first traffic type;
a partner collector status value indicating an acknowledgement of a second actor collector status value received in the first TTSS field; and
a partner distributor status value indicating an acknowledgement of a second actor distributor status value received in the first TTSS field; and exchanging network traffic of the first traffic type with the second switch based on the first link state.

9. The method of claim 8, wherein:
the second actor collector status value indicates whether the second switch is ready to receive network traffic of the first traffic type on the link; and
the second actor distributor status value indicates whether the second switch is ready to transmit network traffic of the first traffic type on the link.

10. The method of claim 8, wherein transmitting the second TTSS field is performed by transmitting the second TTSS field in a second management packet to the second switch over the link, the second management packet including the second TTSS field, an actor information field, and a partner information field.

11. The method of claim 10, further comprising periodically exchanging additional first and second management packets with the second switch.

12. The method of claim 8, wherein the first management packet is a link aggregation control protocol (LACP) data unit.

13. The method of claim 12, wherein the first TTSS field is a TTSS type-length-value (TLV) field compatible with the LACP.

14. The method of claim 8, wherein:
the first traffic type is data traffic; and
the second traffic type is control traffic.

15. An information handling system comprising:
a first switch comprising:
a control unit comprising one or more processors;
a memory coupled to the control unit; and
a port coupled to the control unit and configured to couple the first switch to a second switch using a network link;
wherein the memory includes a plurality of machine-readable instructions which when executed by the one or more processors are adapted to cause the one or more processors to:
receive a first traffic type state separation (TTSS) field in a first management packet on the network link from the second switch;
determine a first link state for the network link for a first traffic type based on the first TTSS field and whether the first switch is ready to transmit network traffic of the first traffic type and receive network traffic of the first traffic type;
determine a second link state for the network link for a second traffic type different from the first traffic type;
transmit a second TTSS field including:
a first actor collector status value indicating whether the first switch is ready to receive network traffic of the first traffic type;
a first actor distributor status value indicating whether the first switch is ready to transmit network traffic of the first traffic type;
a partner collector status value indicating an acknowledgement of a second actor collector status value received in the first TTSS field; and
a partner distributor status value indicating an acknowledgement of a second actor distributor status value received in the first TTSS field; and
exchange network traffic of the first traffic type with the second switch based on the first link state.

16. The information handling system of claim 15, wherein:
the second actor collector status value indicates whether the second switch is ready to receive network traffic of the first traffic type on the network link; and
the second actor distributor status value indicates whether the second switch is ready to transmit network traffic of the first traffic type on the network link.

17. The information handling system of claim 15, wherein the second TTSS field is transmitted in a second management packet to the second switch over the network link, the second management packet including the second TTSS field, an actor information field, and a partner information field.

18. The information handling system of claim 17, wherein the second management packet is a link aggregation control protocol (LACP) data unit.

19. The information handling system of claim 18, wherein the second TTSS field is a TTSS type-length-value (TLV) field compatible with the LACP.

20. The information handling system of claim 15, wherein:
the first traffic type is data traffic; and
the second traffic type is control traffic.

* * * * *